US009069223B2

(12) United States Patent
Prosyk

(10) Patent No.: US 9,069,223 B2
(45) Date of Patent: Jun. 30, 2015

(54) MACH-ZEHNDER OPTICAL MODULATOR USING A BALANCED COPLANAR STRIPLINE WITH LATERAL GROUND PLANES

(71) Applicant: COGO Optronics, Inc., Boulder, CO (US)

(72) Inventor: Kelvin Prosyk, Luskville (CA)

(73) Assignee: TERAXION INC., Quebec (CA)

( * ) Notice: Subject to any disclaimer, the term of this patent is extended or adjusted under 35 U.S.C. 154(b) by 0 days.

(21) Appl. No.: 13/767,525

(22) Filed: Feb. 14, 2013

(65) Prior Publication Data

US 2013/0209023 A1    Aug. 15, 2013

Related U.S. Application Data

(60) Provisional application No. 61/598,994, filed on Feb. 15, 2012.

(51) Int. Cl.
*G02F 1/225* (2006.01)
*G02F 1/01* (2006.01)

(52) U.S. Cl.
CPC .............. *G02F 1/225* (2013.01); *G02F 1/011* (2013.01); *G02F 2201/126* (2013.01); *G02F 2201/127* (2013.01)

(58) Field of Classification Search
CPC .... G02B 6/1228; G02B 6/305; G02F 1/2255; G02F 1/225; G02F 2001/212; G02F 2001/126; G02F 1/0121; G02F 1/218; G02F 1/2257; G02F 2201/122; G02F 2202/101; G02F 2203/25; G02F 2201/126; G02F 2201/127
See application file for complete search history.

(56) References Cited

U.S. PATENT DOCUMENTS

| 5,278,923 | A | 1/1994 | Nazarathy et al. |
| 6,552,838 | B2 | 4/2003 | Ransijn et al. |
| 8,280,201 | B2 | 10/2012 | Prosyk |
| 2004/0052443 | A1 | 3/2004 | Heaton et al. |
| 2006/0023288 | A1 | 2/2006 | McBrien et al. |
| 2008/0089634 | A1* | 4/2008 | Mosinskis et al. ................ 385/3 |
| 2008/0170821 | A1 | 7/2008 | Kissa et al. |
| 2010/0111303 | A1 | 5/2010 | Finlayson et al. |
| 2011/0135242 | A1 | 6/2011 | Prosyk |

FOREIGN PATENT DOCUMENTS

| EP | 2615489 A1 | 7/2013 |
| WO | 02/50606 A1 | 6/2002 |

OTHER PUBLICATIONS

PCT Notification of Transmittal of the International Search Report and the Written Opinion of the International Searching Authority for International Application No. PCT/US/2013/026290, dated May 6, 2013, 4 pages.

(Continued)

*Primary Examiner* — Ryan Lepisto
*Assistant Examiner* — Erin Chiem
(74) *Attorney, Agent, or Firm* — Hovey Williams LLP

(57) ABSTRACT

A Mach-Zehnder optical modulator with a series push-pull traveling wave electrode uses a balanced coplanar stripline with lateral ground planes. Two signal electrodes extend along the center of the optical modulator adjacent and parallel to the optical waveguides in a series push-pull configuration. The ground planes run parallel to the signal electrodes, but are spaced laterally outward from the signal electrodes.

6 Claims, 10 Drawing Sheets

(56) References Cited

OTHER PUBLICATIONS

Klein et al., "1.55pm Mach-Zehnder Modulators on InP for optical 40/80 Gbit/s transmission networks," OFC/NFOEC 2006, paper TuA2, pp. 171-173.

Walker, "High-Speed III-V Semiconductor Intensity Modulators," IEEE J. Quant. Elect., vol. 27(3), Mar. 1991, pp. 654-667.

Tsuzuki et al., "40 Gbit/s n-i-n InP Mach-Zehnder modulator with a π voltage of 2.2V," Electronics Letters, vol. 39, No. 20, Oct. 2, 2003, 2 pages.

McLean et al., "Analysis of a New Configuration of Coplanar Stripline," IEEE Transactions on Microwave Theory and Techniques, vol. 40, No. 4, Apr. 1992, pp. 772-774.

\* cited by examiner

MACH-ZEHNDER OPTICAL MODULATOR USING A BALANCED COPLANAR STRIPLINE WITH LATERAL GROUND PLANES

RELATED APPLICATION

The present application is based on and claims priority to the Applicant's U.S. Provisional Patent Application 61/598,994, entitled "Mach-Zehnder Optical Modulator Using A Balanced Coplanar Stripline With Lateral Ground Planes," filed on Feb. 15, 2012.

BACKGROUND OF THE INVENTION

1. Field of the Invention

The present invention relates generally to the field of Mach-Zehnder optical modulators. More specifically, the present invention discloses a Mach-Zehnder optical modulator using a balanced coplanar stripline with lateral ground planes.

2. Background of the Invention

Mach-Zehnder optical modulators have been employed for many years in the field of optical communications to accept modulated data in electrical (e.g., radio frequency) format and transfer the data onto an optical carrier. In a Mach-Zehnder optical modulator as generally shown in FIG. 1, a beamsplitter 12 divides the laser light from the input optical waveguide 11 into two paths 15A and 15B, at least one of which has a phase modulator in which the refractive index is a function of the strength of the local electric field. The beams are then recombined by an output optical combiner 16. Changing the electric field on the phase modulating path will then determine whether the two beams interfere constructively or destructively at the output, and thereby control the amplitude or intensity of the exiting light.

Some Mach-Zehnder optical modulators employ a series push-pull travelling wave electrode, as shown in FIG. 1, after Klein et al., "1.55 μm Mach-Zehnder Modulators on InP for optical 40/80 Gbit/s transmission networks", OFC/NFOEC 2006, paper TuA2, and is described in further detail by R. G. Walker, "High-Speed III-V Semiconductor Intensity Modulators", IEEE J. Quant. Elect., vol. 27(3), pp. 654-667, 1991. A travelling wave electrode (or TWE) consists of two or more transmission line conductors 13A, 13B oriented substantially parallel to the optical paths 15A, 15B and a plurality of waveguide electrodes 14A, 14B. Each waveguide electrode 14A, 14B is connected to at least one of the transmission line conductors 13A, 13B via a tap or bridge conductor. Each bridge conductor branches out of a transmission line conductor 13A, 13B in a direction substantially perpendicular to the optical path 15A, 15B. The transmission line conductors 13A, 13B convey an RF signal in an RF path that is substantially parallel to the optical paths 15A, 15B.

A Mach-Zehnder modulator is operated in push-pull mode when a common voltage or field is used to phase modulate the interfering signals in the two arms in anti-phase. In a series push-pull configuration, each pair of waveguide electrodes 14A, 14B, as shown in FIG. 1, that impart a phase change to the optical wave in the waveguide 15A, 15B also act as a pair of capacitors in series and as a load on the main transmission line 13A, 13B. The cross-section view of a pair of waveguide electrodes in FIG. 2 shows the lateral RF current flow 24 between the two signal arms through a common conducting backplane 25 above an insulating substrate 26 in this example of a series push-pull device. When a voltage difference is applied between the two waveguide electrodes 14A, 14B, the current 24 flows from the highly p-doped contact material 22A, 22B beneath the waveguide electrode 14A, 14B, through one p-i-n junction and the common conducting n-backplane 25, and up through the opposite p-i-n junction and signal conductor. A simplified electrical diagram of this is shown in FIG. 3. The p-i-n semiconductor layers act as capacitors 32 that are connected in series through the common conducting n-backplane 25. This series connection will halve the required loading capacitance on the main transmission line compared to designs with electrically-independent Mach-Zehnder arms, leading to major performance advantages with regards to bandwidth.

As shown in FIG. 1, a series push-pull travelling wave electrode Mach-Zehnder optical modulator typically includes: (1) an input optical waveguide 11 for receiving an input optical signal; (2) a beamsplitting means 12 for splitting the optical signal into a first optical branch and a second optical branch; (3) first and second optical waveguides 15A, 15B conveying the light from the two branches of the optical signal, respectively; (4) two or more transmission line conductors 13A, 13B for receiving and conveying an input electrical signal; (5) a plurality of pairs of waveguide electrodes 14A, 14B positioned adjacent to the first and second optical waveguides 15A and 15B, respectively, and electrically connected to the respective transmission line conductors 13A, 13B, so that the waveguide electrodes 14A, 14B alter the phase of the optical signal in response to the input electrical signal; and (6) a combining means 16 that recombines the beams at the output of the optical modulator. It should be noted that the optical and electrical signals propagate in substantially the same direction along the optical modulator.

Some embodiments of the prior-art travelling wave modulator shown in FIG. 1 employ two transmission line conductors 13A and 13B, one of which carries the input electrical signal (S) and the other of which is connected to a reference or ground (G) potential. This is sometimes referred to as an SG configuration. A conventional approach to driving this configuration, known as single-ended drive, is illustrated in FIG. 4. One output of an RF driver 41 having an output impedance 42 is connected to the S transmission line conductor of the optical modulator via, e.g., the center conductor 44 of a coaxial cable 43. The other output of the RF driver 41 is grounded and connected to the G transmission line conductor of the optical modulator via, e.g., the outer conductor of a co-axial cable 43. A nominal terminal load 45 (e.g. 50 ohms) connects the distal ends of the travelling wave electrode. It should be noted that the modulation voltage across the S and G conductors of the travelling wave electrode is the difference between the signal voltage and ground. This configuration has the disadvantage of losing a large fraction of the electrical power supplied by the RF driver 41. A further disadvantage of the design of Klein becomes apparent when multiple modulators are monolithically integrated in close proximity to each other on a single chip. Alternating voltages and currents are present in both transmission line conductors. These voltages and currents couple strongly to the transmission line conductors of the neighboring modulators in a disadvantageous phenomenon known as crosstalk.

In contrast to Klein, other traveling wave Mach-Zehnder modulators use a configuration shown in FIG. 5, also known as GSGSG, employing five transmission line conductors. This type of optical modulator is described, for example, by Tsuzuki et al., "40 Gbit n-i-n InP Mach-Zehnder Modulator with a Tr Voltage of 2.2 V", Electronics Letters, vol. 39, no. 20, Oct. 2, 2003. The optical modulator consists of two independent signal transmission line conductors (S+ and S-), each with an adjacent ground transmission line conductor (G1 and G3, respectively), and with a ground transmission line conductor G2 interposed between them. Because of the interposed ground conductor G2, S+ and S− are electrically independent, and the current-return path of each is via G1/G2, and G2/G3, respectively. Nominal loads (e.g., two 100 ohm resistors in parallel) connect the distal ends of S+ with G1 and G2, and S− with G2 and G3.

A conventional approach to driving this configuration, known as differential drive, is illustrated in FIG. 6. Both outputs (S+ and S−) of the RF driver 61 are connected through two waveguides (e.g., coaxial cables 63) to the travelling wave electrodes, and the outer conductors of both coaxial cables 63 are grounded. Both outputs of the RF driver 61 have a characteristic output impedance 62. In the case of differential drive modulation, the ground conductors of the two coaxial cables 63 are connected to the ground transmission line conductors G1, G2 and G3 of the optical modulator 10. Nominal termination loads 65 (e.g., 50 ohms for each of S+ and S−) are connected across the distal ends of the travelling wave electrodes. The outputs from the RF driver 61 are in anti-phase (i.e., S+ and S− are 180 degrees out of phase) and the modulation voltage across the travelling wave electrode is S+ minus S−. In this configuration both RF driver outputs are utilized, greatly improving the power efficiency compared to the single-ended drive condition.

A critical distinction between the optical modulator of Tsuzuki and the modulator of Klein is that Tsuzuki uses an independent traveling wave electrode for each of the first and second optical branches of the modulator. The signal lines of the device (S+ and S−) are electrically independent and have a ground return line interposed between them. In the case of a series push-pull Mach-Zehnder optical modulator as in FIGS. 1 and 2, the two transmission line conductors are coupled and act as a return path for each other. Tsuzuki does not teach how to implement differential electrical drive with a series push-pull Mach-Zehnder optical modulator. Although differential drive has better power efficiency than single-end drive, and the GSGSG architecture is less prone to crosstalk than SG, the design of Tsuzuki disadvantageously does not result in a halving of the loading capacitance, as it did in the single-end design of Klein. The introduction of an intermediate ground plane between the two arms of a Mach-Zehnder optical modulator also increases the footprint compared to in the Klein modulator of FIG. 1.

The prior art in this field also includes the following. J. S. McLean et al., "Analysis Of A New Configuration Of Coplanar Stripline", IEEE Transactions On Microwave Theory And Techniques, Vol. 40, No. 4, April 1992, provides an early discussion of lateral ground planes for a coplanar stripline. However, this is not described in the context of Mach-Zehnder optical modulators.

An example of a GaAs/AlGaAs series push-pull travelling wave electrode Mach-Zehnder modulator was demonstrated by R. G. Walker, "High-Speed III-V Semiconductor Intensity Modulators", IEEE J. Quant. Elect., vol. 27(3), pp. 654-667, 1991. In his FIG. 13, Walker shows an incoming electrical waveguide consisting of a single (non-differential) signal conductor with two ground conductors. One of the ground conductors is open-terminated without contact to the Mach-Zehnder modulator. It should be noted that the Walker solution cannot use both S+ and S− signals from a differential driver, thereby losing a large fraction of the electrical power, and suffers from poor modulation performance due to the open-terminated ground conductor.

J. Ransijn et al., U.S. Pat. No. 6,552,838, "LiNbO$_3$ Mach-Zehnder Modulator with Low Drive Voltage Requirement and Adjustable Chirp," presents a differential-drive LiNbO$_3$ modulator. Like the modulator demonstrated by Tsuzuki, the two arms of this Mach-Zehnder modulator are electrically independent. There is no common conducting backplane under the optical waveguides to place the electrode capacitance in series, so it does not benefit from the halving of the capacitance derived from the series push-pull configuration. The two arms of the Mach-Zehnder modulator are independently driven, with two electrical RF drive voltages required.

In summary, the current state of the art Mach-Zehnder modulators have separately demonstrated the advantage of a lower waveguide electrode capacitance using a series push-pull traveling wave electrode SG configuration and the advantages of reduced power consumption and lower crosstalk when using a GSGSG configuration with differential drive. Thus far, none of the prior-art has presented a Mach-Zehnder modulator capable of combining these advantages. Accordingly, there is a strong desire to combine the advantages of lower capacitance, reduced crosstalk, and compatibility with differential drive into a single Mach-Zehnder modulator design.

SUMMARY OF THE INVENTION

This invention provides a Mach-Zehnder optical modulator with a series push-pull traveling wave electrode using a balanced coplanar stripline with lateral ground planes. Two signal electrodes extend along the center of the optical modulator adjacent to the optical waveguides in a series push-pull configuration. The ground planes run parallel to the signal electrodes, but are spaced laterally outward from the signal electrodes.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 2 is a cross-sectional view of a bridging conductor section of a Mach-Zehnder modulator operated in push-pull mode.

FIG. 3 is a simplified circuit diagram of a Mach-Zehnder modulator operated in push pull mode.

DETAILED DESCRIPTION OF THE INVENTION

Figure 7:
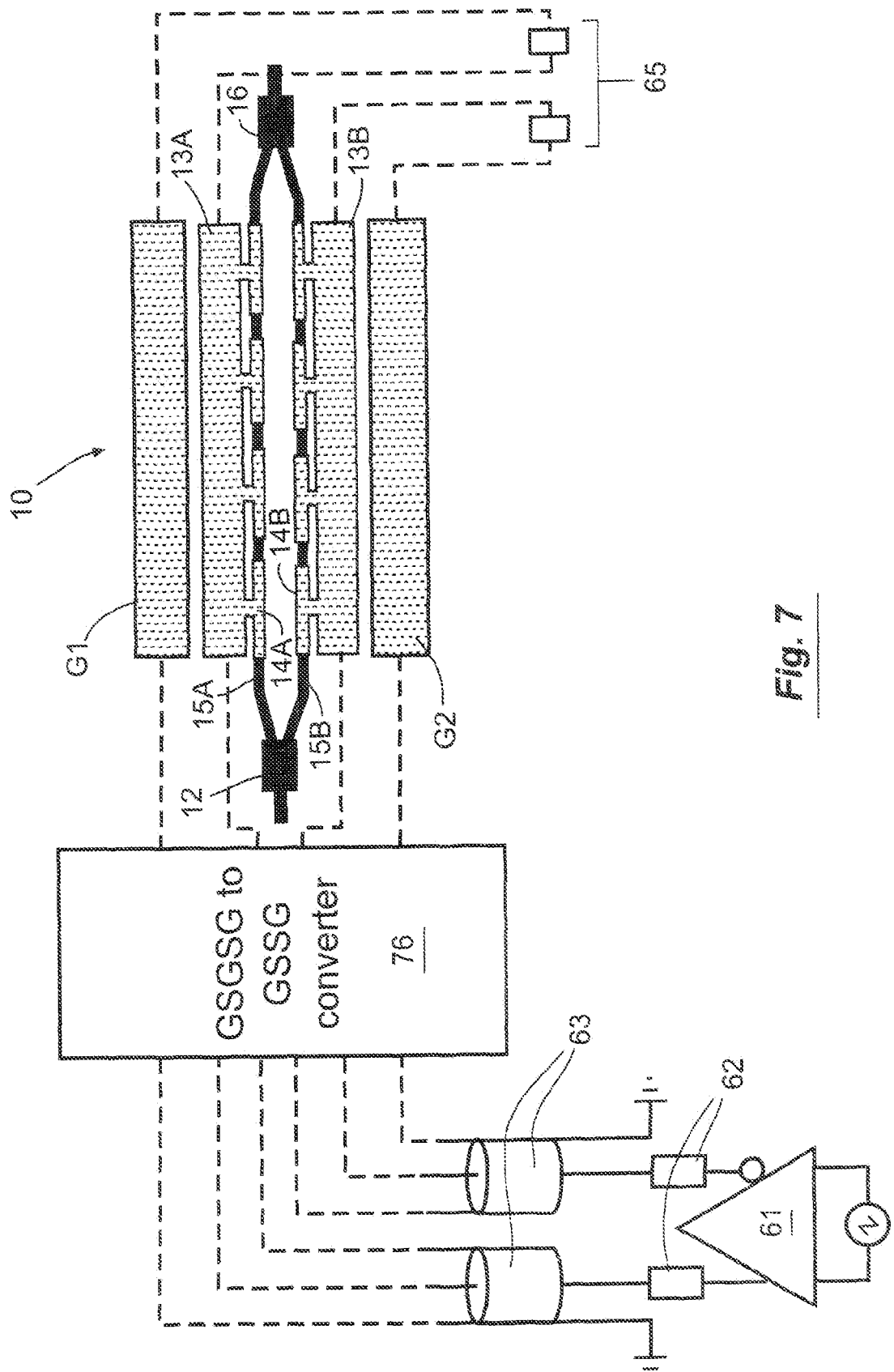
FIG. 7 is a schematic diagram of an embodiment of the present invention including differential driver circuitry.

FIG. 7 is a schematic of a Mach-Zehnder optical modulator embodying the present invention. FIG. 7 also includes the differential driver circuit 61 and a transmission line converter section 76 that is the subject of the Applicant's U.S. patent application Ser. No. 13/722,400, entitled "Electronic Waveguide Transmission Device For Use With A Mach-Zehnder Optical Modulator," filed on Dec. 20, 2012. This patent application is hereby incorporated by reference. The optical configuration of the device generally follows that of a conventional Mach-Zehnder optical modulator. A beamsplitter 12 divides the input optical signal into two optical paths that propagate in parallel along two optical waveguides 15A, 15B. A series push-pull traveling wave electrode is used to modulate the relative phase of optical signals along these optical waveguides. The beams are then recombined by an optical recombining element 16 at the output. Changing the electric field on the phase-modulating paths by means of the travelling wave electrode determines whether the two beams interfere constructively or destructively at the output, and thereby controls the amplitude of the exiting light.

Figure 1:
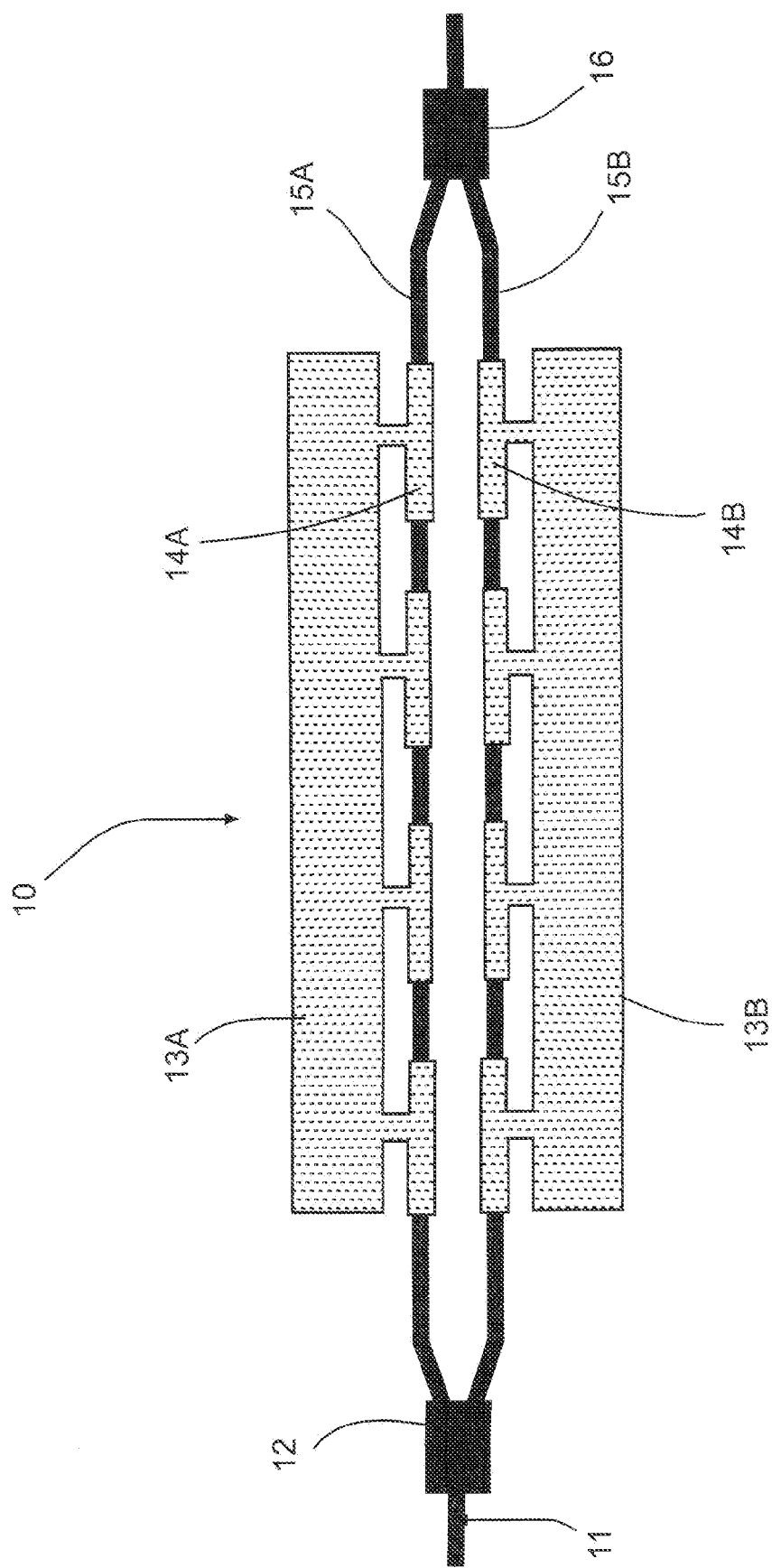
FIG. 1 is a schematic diagram of a prior-art series push-pull traveling wave electrode Mach-Zehnder optical modulator 10.
Figure 2:
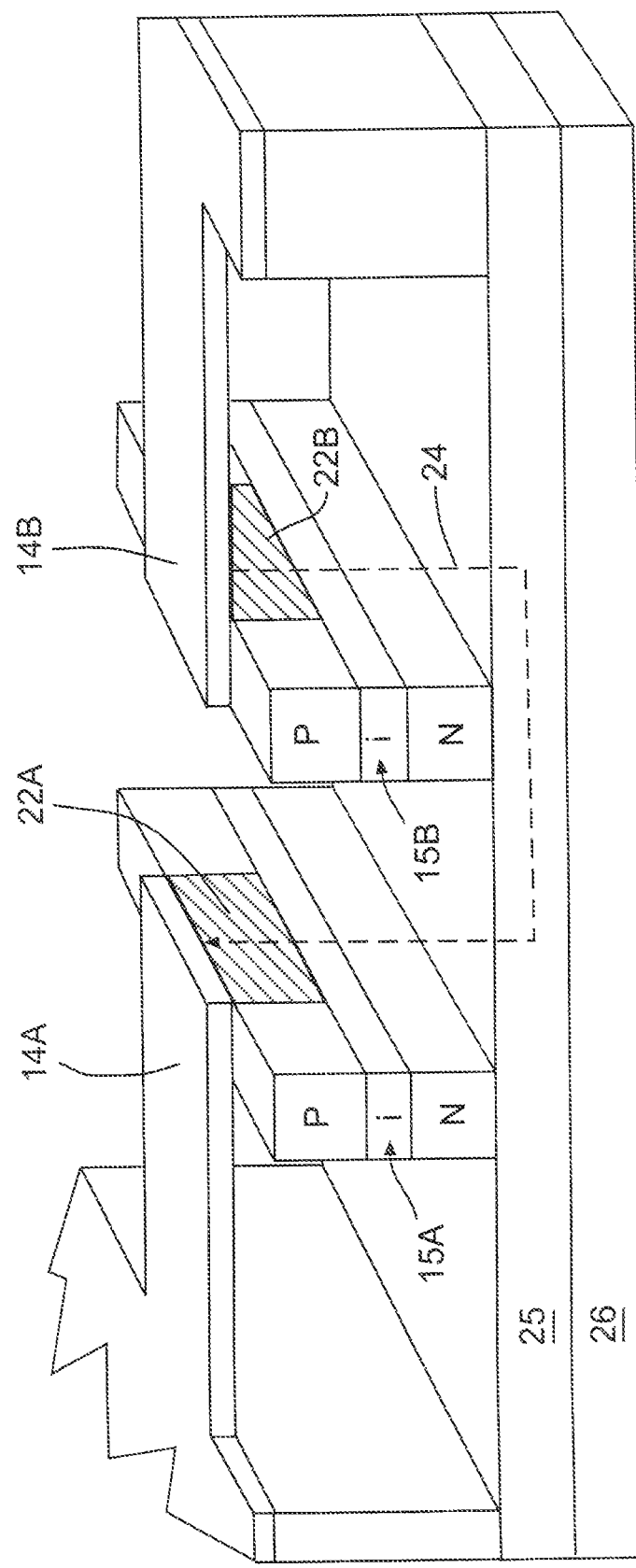
FIG. 2 is a cross-sectional view of a bridging conductor section of FIG. 1.

The structure of the GSSG series push-pull travelling wave electrode in the present invention is also shown in FIG. 7. FIG. 2 is a cross-sectional view through the embodiment illustrated in FIG. 7. Two signal electrodes 13A and 13B extend parallel and adjacent to the optical waveguides 15A and 15B. Two ground planes G1 and G2 run parallel to the signal electrodes 13A, 13B, but are spaced laterally outward from the signal electrodes 13A, 13B, as shown in FIG. 7.

Figure 3:
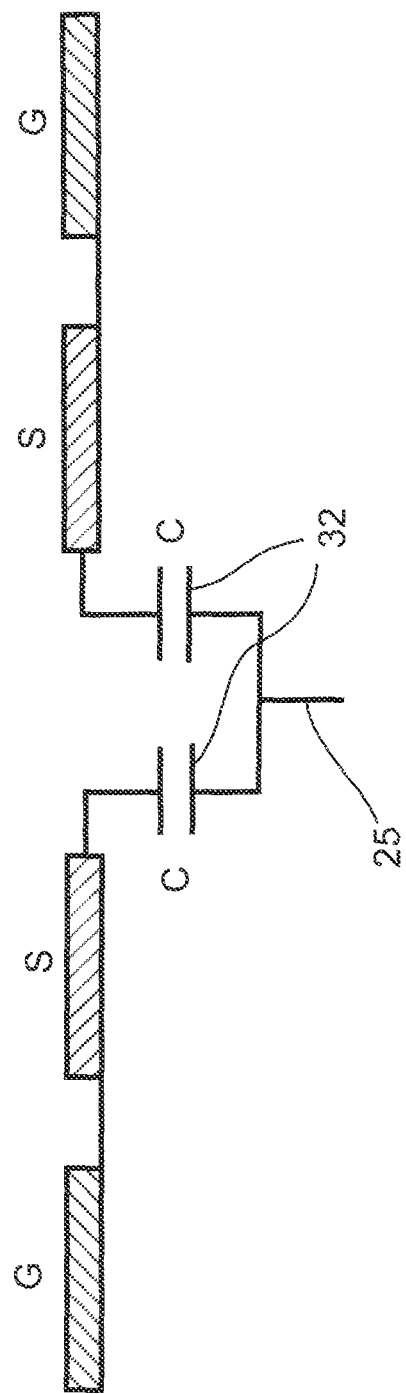
FIG. 3 is a simplified circuit diagram of the cross-sectional view of FIG. 2.
Figure 4:
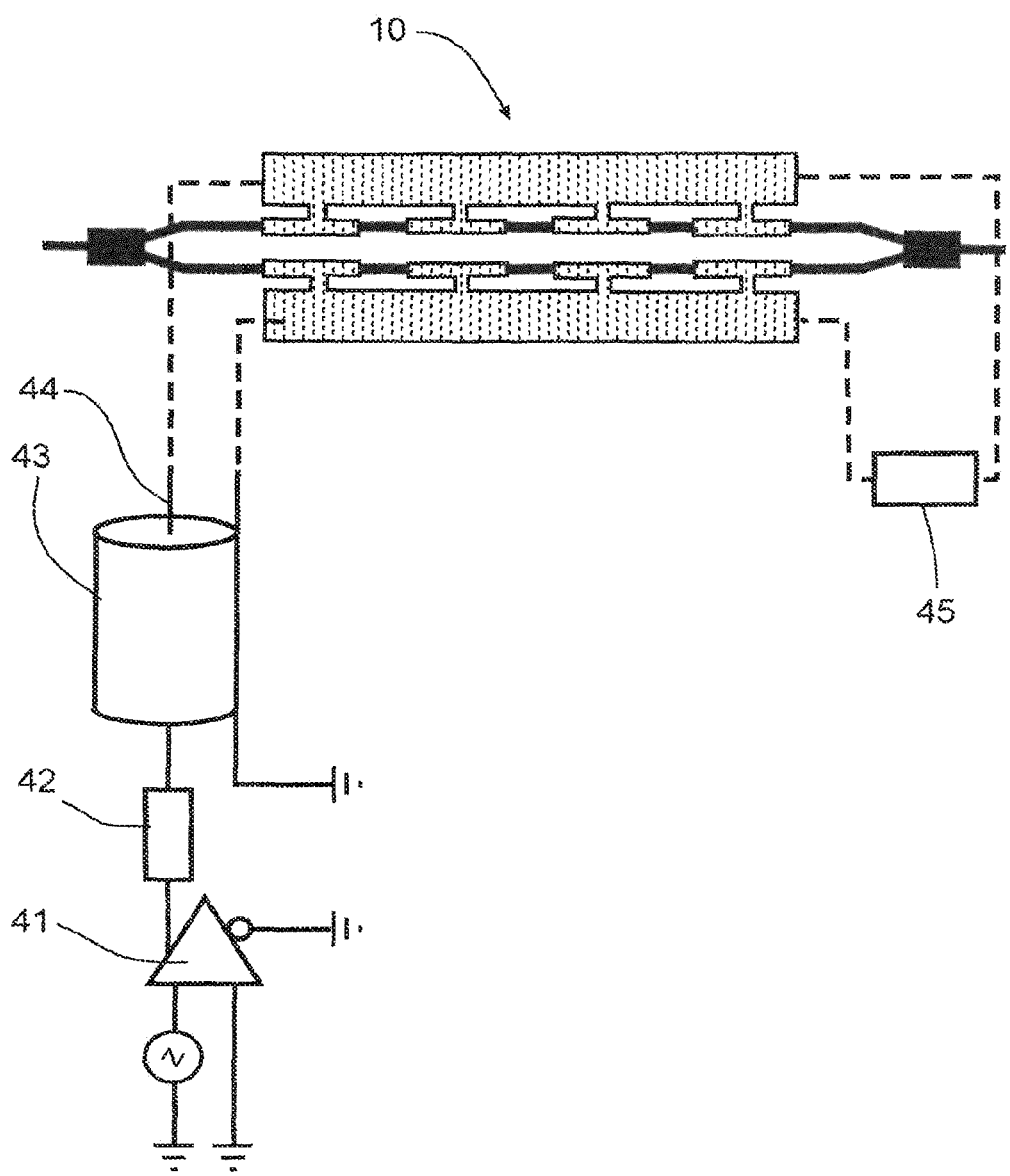
Figure 5:
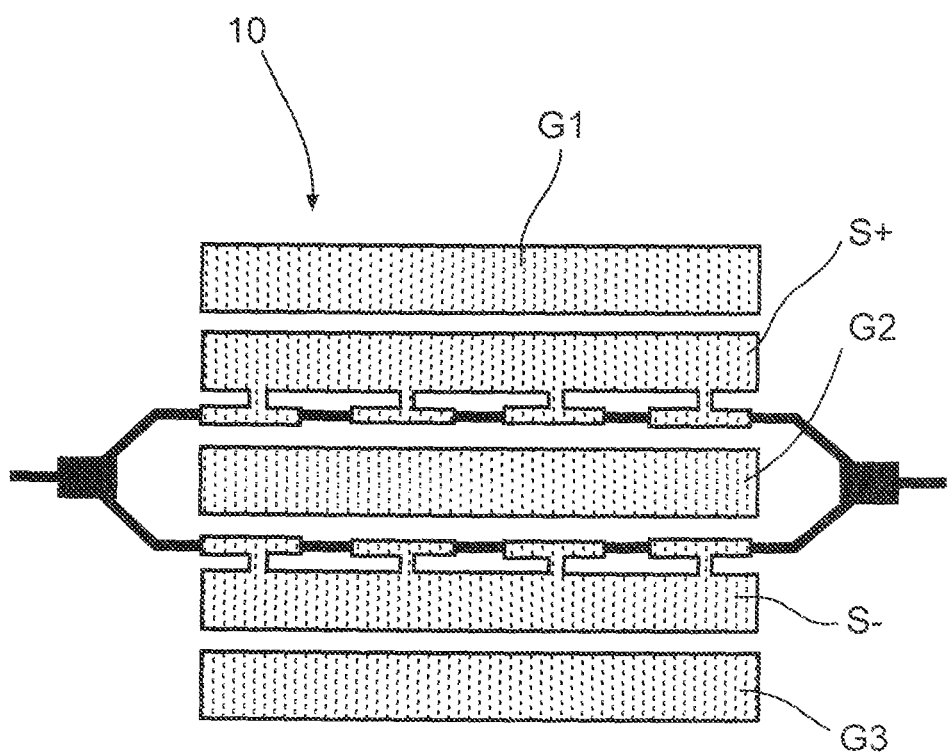
Figure 6:
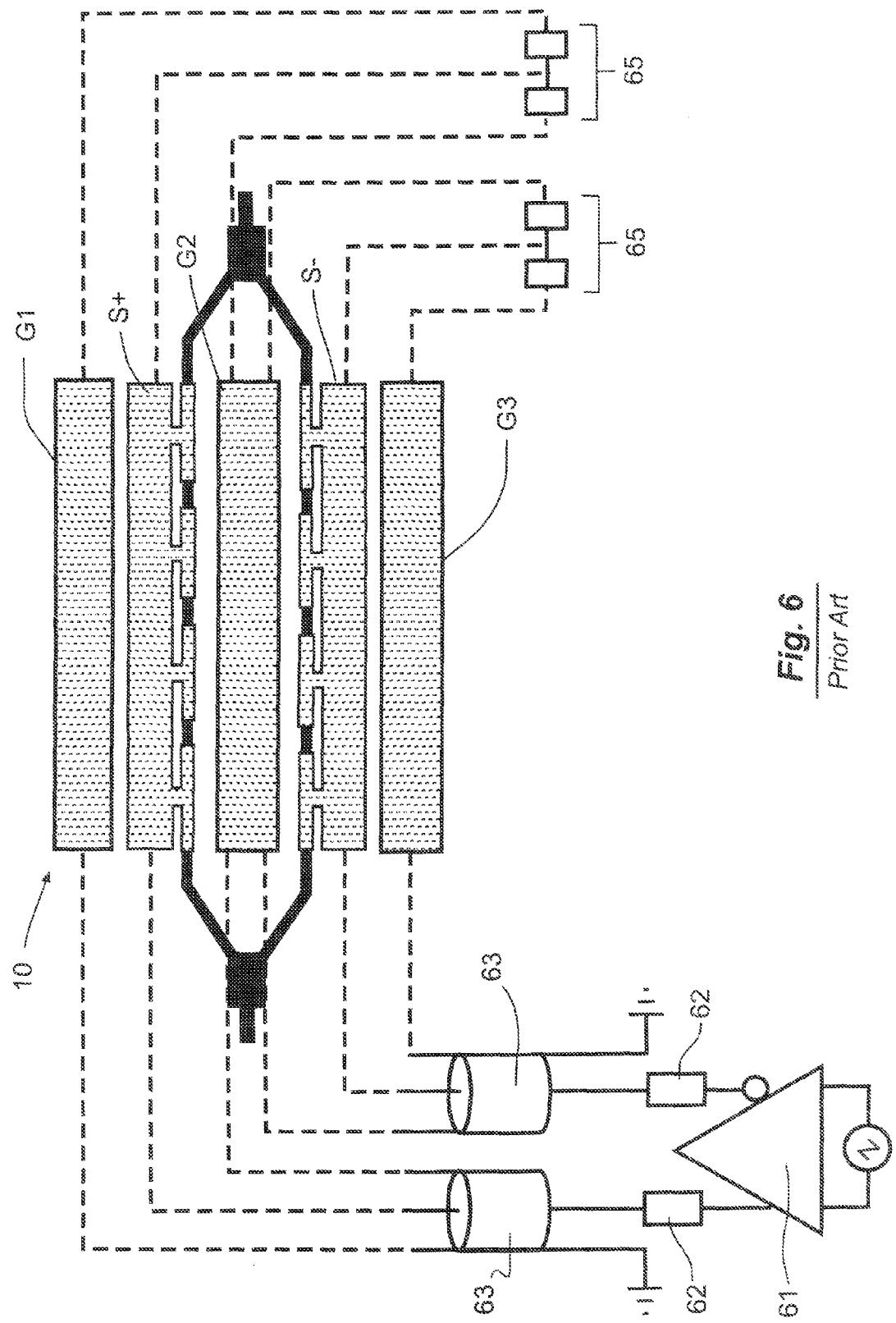
FIG. 6 is a schematic diagram showing how the optical modulator in FIG. 5 can be driven with a differential driver through a pair of coaxial cables 63.

In the embodiment shown in FIGS. 7 and 2, a plurality of pairs of waveguide electrodes 14A, 14B extend from the signal electrodes 13A, 13B and are coupled to the optical waveguides 15A, 15B at spaced intervals along the traveling wave electrode. These loading capacitance layers are connected to, but extend laterally inward from the signal electrodes 13A and 13B. The ground planes G1, G2 and signal conductors 13A, 13B are not in physical contact with the optical waveguides 15A, 15B, but the waveguide electrodes 14A, 14B are. In particular, the inner waveguide electrodes 14A, 14B are electrically connected through the p-i-n junctions and across a lower common conductive plane 25, to form a series push-pull traveling wave electrode from the Mach-Zehnder optical modulator, as shown in FIGS. 2 and 3 and discussed above. In other words, the common conductive plane 25 provides a signal path for the differential electrical modulation signal between the signal electrodes 13A, 13B through the waveguide electrodes 14A, 14B and optical waveguides 15A, 15B. For example, each optical waveguide 15A, 15B can be provided with a first, lower surface adjacent to the common conductive plane 25, and a second, upper surface adjacent to one set of waveguide electrodes 14A or 14B connected to one of the signal electrodes 13A or 13B.

The present invention provides a number of advantages over the prior-art. Having the two signal electrodes 13A, 13B in the center and connected electrically by a floating lower conductive plane 25, with no ground interposed between the two, in a series push-pull configuration allows for a halving of the required loading capacitance. This results in an improved trade-off between bandwidth and drive voltage, and also allows the Mach-Zehnder modulator arms to be placed close together since no interceding ground metal is required. Close proximity of the Mach-Zehnder modulator arms minimizes optical losses due to fan-out of the waveguides from the couplers, and minimizes the size of the chip. Furthermore, the lateral ground planes reduce RF dispersion, and also shield the inner signal conductors 13A, 13B from parasitic interaction with the environment.

Figure 8:
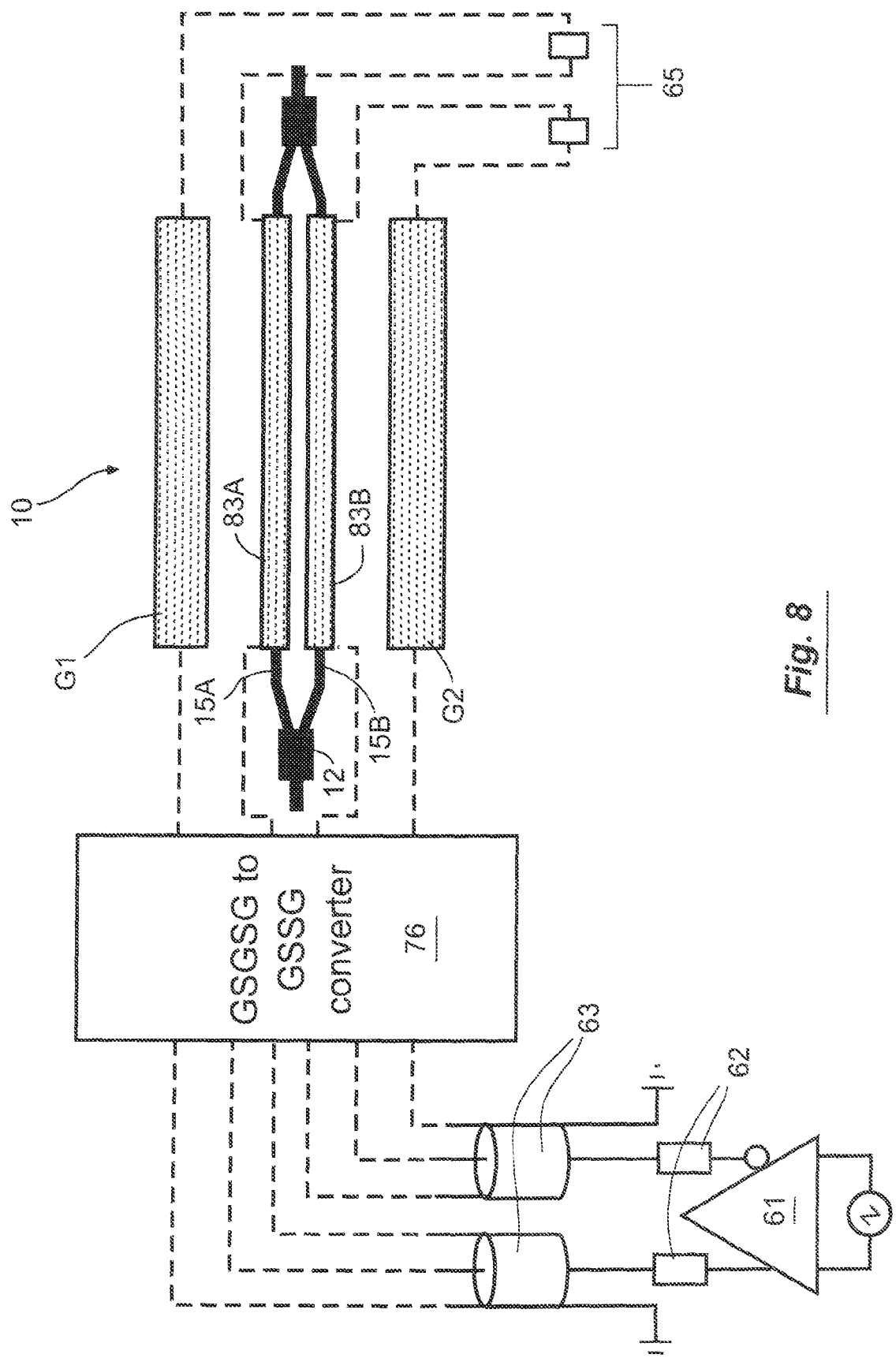
FIG. 8 is a schematic diagram of an alternative embodiment of the present invention in which the signal electrodes (S) are in direct contact with the optical waveguides of the Mach-Zehnder optical modulator 10, as well as differential driver circuitry.

FIG. 8 is a schematic diagram of an alternative embodiment of the present invention. FIG. 8 also includes the differential driver circuit 61 and a transmission line converter section 76. The signal electrodes 83A and 83B are now in direct contact with the Mach-Zehnder optical waveguides 15A and 15B. This has the advantage of few conductors, but the disadvantage that the loading capacitance per unit length can no longer be independently adjusted by changing the fill factor. Note that his embodiment continues to be a series push-pull configuration, but the signal and waveguide electrodes are now indistinct.

Figure 9:
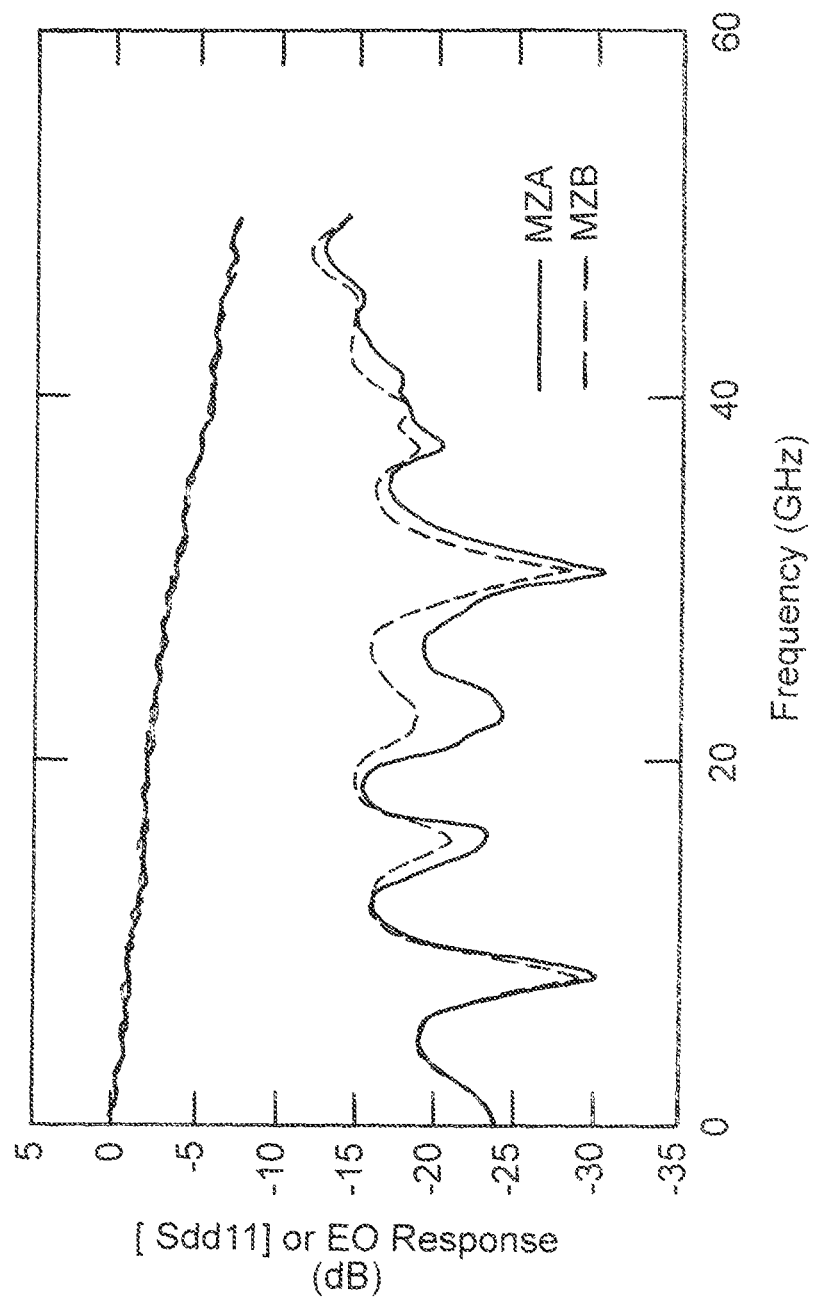
FIG. 9 is a graph showing measurement of the bandwidth and |Sdd11| for a pair of Mach-Zehnder devices (MZA and MZB) of the preferred embodiment placed laterally adjacent to each other.

FIG. 9 is a measurement of |Sdd11| and the EO response of two integrated Mach-Zehnder optical modulators embodying the present invention, MZA and MZB, that are placed laterally adjacent to each other. The two devices have a bandwidth of greater than 25 GHz with a good match to the 100Ω load such that |Sdd11| is less than −14 dB up to 40 GHz for both Mach-Zehnder optical modulators.

Figure 10:
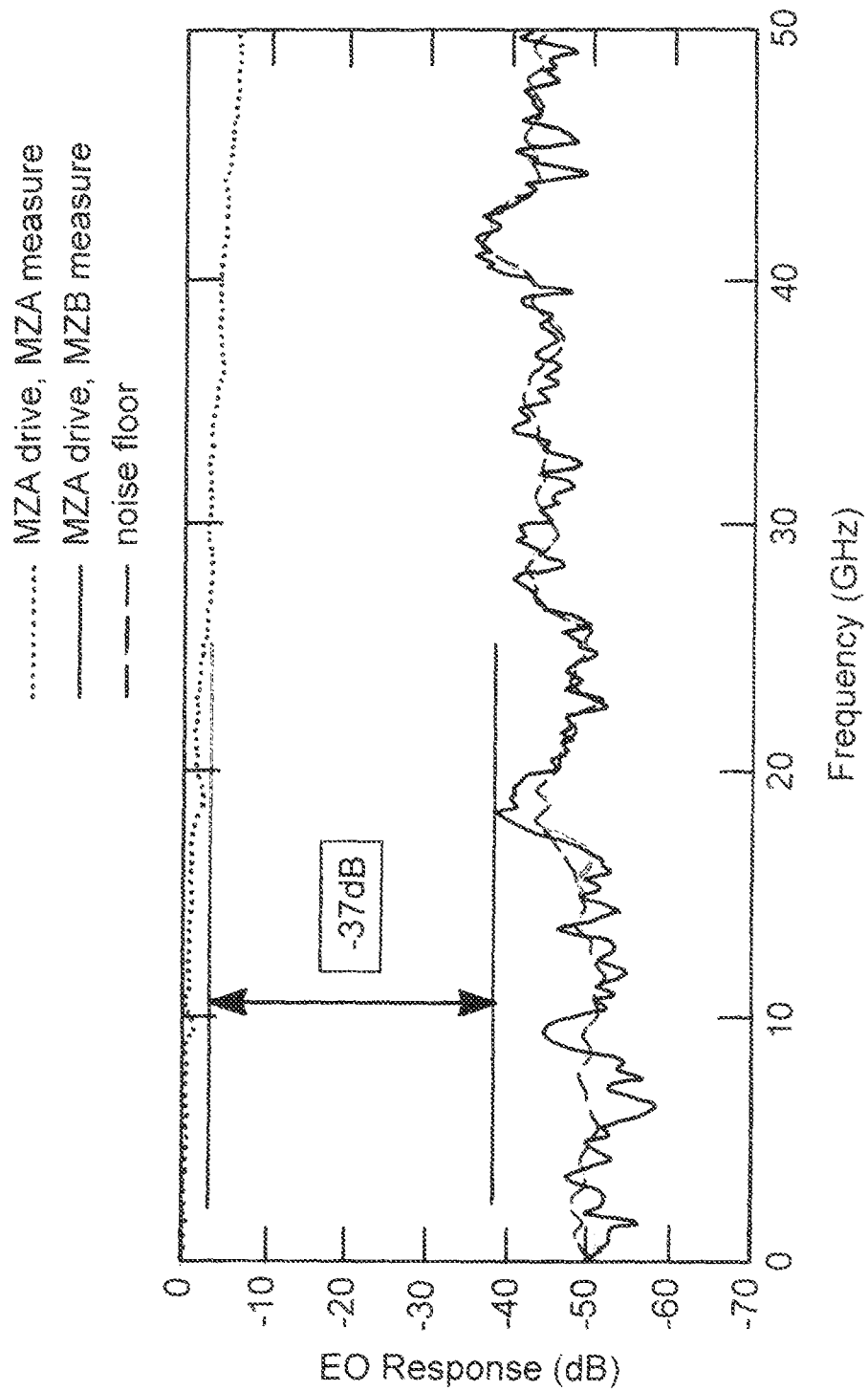
FIG. 10 is a graph showing cross-talk measurement between two Mach-Zehnder devices (MZA and MZB) of the preferred embodiment placed laterally adjacent to each other.

FIG. 10 is a measurement of the cross-talk between two integrated Mach-Zehnder optical modulators embodying the present invention, MZA and MZB, that are placed laterally adjacent to each other. The EO response measured at MZB when stimulus is provided to MZA is attenuated by more than 37 dB compared to the EO response measured at MZB when stimulus is provided to MZB. This demonstrates the effectiveness of the lateral ground planes in isolating the signal lines from parasitic signals.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A Mach-Zehnder optical modulator comprising:
   two optical waveguides;
   a beamsplitter dividing an input optical signal into two optical signals propagating in parallel along the optical waveguides;
   a series push-pull traveling wave electrode having two signal electrodes extending parallel and adjacent to the optical waveguides with no ground electrode interposed between the two signal electrodes, said signal electrodes carrying a differential electrical modulation signal to induce a change in relative phase of the optical signals along the optical waveguides;
   ground planes running parallel to the signal electrodes and spaced laterally outward from the signal electrodes and providing a return path to ground for the differential electrical modulation signal;
   a common conductive plane between the optical waveguides providing a signal path for the differential electrical modulation signal between the signal electrodes through the optical waveguides without providing a return path to ground for the differential electrical modulation signal; and
   an optical element recombining the optical signals exiting the optical waveguides into an output optical signal.

2. A Mach-Zehnder optical modulator of claim 1 wherein each optical waveguide further comprises a first surface adjacent to the common conductive plane, and a second surface adjacent to one of the signal electrodes.

3. A Mach-Zehnder optical modulator of claim 1 wherein the signal conductors are coupled to the optical waveguides via a plurality of pairs of waveguide electrodes coupled to the optical waveguides at spaced intervals along the traveling wave electrode.

4. A Mach-Zehnder optical modulator of claim 1 wherein the signal conductors are directly connected to the optical waveguides and run continuously along the optical waveguides over the length of the traveling wave electrode.

5. A Mach-Zehnder optical modulator of claim 1 further comprising a differential driver generating the differential electrical modulation signal for the signal electrodes.

6. A Mach-Zehnder optical modulator comprising:
two optical waveguides, each optical waveguide having a first surface and a second surface;
a beamsplitter dividing an input optical signal into two optical signals propagating in parallel along the optical waveguides;
a series push-pull traveling wave electrode having two signal electrodes extending parallel and adjacent to the optical waveguides, said signal electrodes carrying a differential electrical modulation signal to induce a change in relative phase of the optical signals along the optical waveguides with no ground electrode interposed between the two signal electrodes;
a plurality of pairs of waveguide electrodes extending from the signal electrodes and coupled to the second surfaces of the optical waveguides at spaced intervals along the optical waveguides;
a common conductive plane between the first surfaces of the optical waveguides to provide a signal path for the differential electrical modulation signal between the signal electrodes through the waveguide electrodes and optical waveguides without providing a return path to ground for the differential electrical modulation signal; and
ground planes running parallel to the signal electrodes and spaced laterally outward from the signal electrodes and providing a return path to ground for the differential electrical modulation signal;
an optical element recombining the optical signals exiting the optical waveguides into an output optical signal.

* * * * *